May 21, 1957 D. GRAHAM 2,792,930
DEVICE FOR PAYING OUT A SUBMARINE CABLE FROM A SHIP
Filed April 6, 1953 9 Sheets-Sheet 1

Inventor
David Graham
By John A. Seifert
Attorney

Inventor
David Graham
By John A. Seifert
Attorney

May 21, 1957    D. GRAHAM    2,792,930
DEVICE FOR PAYING OUT A SUBMARINE CABLE FROM A SHIP
Filed April 6, 1953    9 Sheets-Sheet 4

Inventor
David Graham
By John A. Seifert
Attorney

May 21, 1957 D. GRAHAM 2,792,930
DEVICE FOR PAYING OUT A SUBMARINE CABLE FROM A SHIP
Filed April 6, 1953 9 Sheets-Sheet 5

Inventor
David Graham
By John A. Seifert
Attorney

May 21, 1957 D. GRAHAM 2,792,930
DEVICE FOR PAYING OUT A SUBMARINE CABLE FROM A SHIP
Filed April 6, 1953 9 Sheets-Sheet 7

Inventor
David Graham
By John A. Seifert
Attorney

May 21, 1957  D. GRAHAM  2,792,930
DEVICE FOR PAYING OUT A SUBMARINE CABLE FROM A SHIP
Filed April 6, 1953  9 Sheets-Sheet 8

Inventor
David Graham
By John A. Seifert
Attorney

May 21, 1957 D. GRAHAM 2,792,930
DEVICE FOR PAYING OUT A SUBMARINE CABLE FROM A SHIP
Filed April 6, 1953 9 Sheets-Sheet 9

Inventor
David Graham
By John A. Seifert
Attorney

United States Patent Office

2,792,930
Patented May 21, 1957

2,792,930

DEVICE FOR PAYING OUT A SUBMARINE CABLE FROM A SHIP

David Graham, Eltham, London, England, assignor to Johnson & Phillips Limited, London, England, a British company Application April 6, 1953, Serial No. 346,903

Claims priority, application Great Britain July 4, 1952

5 Claims. (Cl. 203—225)

This invention relates to methods of, and apparatus for, laying submarine cables.

In accordance with present practice, the submarine cable to be laid is carried in the hold of a ship, and is conveyed from the hold and passed overboard at the ship's stern by means of a conveyor drum on the deck of the ship around which the cable makes a number of turns.

This method was, in the past, reasonably satisfactory, but in recent years it has become increasingly the practice to connect solid repeaters or other solid objects in the line of cable at intervals of say fifty miles, and, as these repeaters are relatively lengthy and massive, being about eleven feet long and weighing about half a ton, it is not possible to pass them round the conveyor drum. Consequently, whenever a repeater has to be dealt with, the whole cable-laying operation has to be suspended for a matter of hours, while, by man handling, the cable is removed from the drum, shifted longitudinally and recoiled on the drum. Various attempts have been made to overcome this disadvantage, but so far none of them has in our view been practicable or satisfactory.

The present invention has for its primary object the provision of an improved method of and apparatus for laying submarine cables, whereby inter alia the difficulty of dealing with these solid repeaters will be obviated.

The invention consists broadly of a method of laying an undersea cable from shipboard, which comprises gripping the cable between contiguous runs of a pair of endless bands which run on wheels, and paying said cable out from the ship by controlled rotation of at least one of said wheels.

In order that the invention may be the more clearly understood a cable-laying method in accordance therewith, together with apparatus in accordance therewith for carrying the method out, will now be described reference being made to the accompanying drawings wherein:

Figure 7 is a sectional elevation on line VII—VII of Figure 6;

Figure 12 is an elevation of a cradle employed in the apparatus when moving into position;

Figure 13 is an end elevation of the same viewed from the right of Figure 12;

Figure 17:
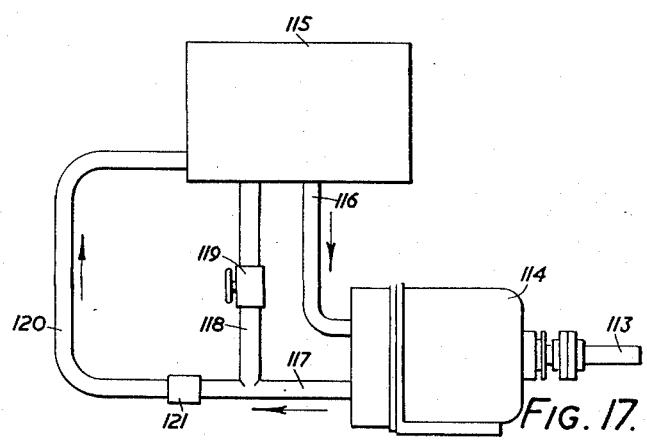
Figure 17 is a somewhat diagrammatic illustration of a hydraulic braking unit for braking the winch.

Referring to the drawings the paying out of the cable 1 from the stowage tank (not shown) over the stern 2 of the ship is effected by means of conveyors or winches of the caterpillar type. We provide two of such winches A and B (Figure 1) on the ship's deck spaced apart along the path of the cable 1 so that the cable passes through them one after the other. Each of said winches comprises two endless chains 3 and 4 each running on two sprockets and arranged parallel to each other with a run of each closely contiguous to a run of the other. The sprockets are designated by the references 5, 6 and 7, 8. The cable 1 is gripped between said two contiguous runs, the chains carrying blocks or pads 9 which engage the cable frictionally, and means being provided (as will hereinafter appear more particularly) to press said two contiguous runs together, so that a sufficient frictional grip is obtained between the blocks 9 and the cable 1. During normal cable laying, the portion of the cable 1 which passes over the ship's stern 2 will be in considerable tension, and the winches A and B must be braked for resisting this tension and paying the cable out at a controlled speed. To this end each winch is provided with its own individual hydraulic braking unit. This is illustrated in Figure 17 and will be more particularly described hereinafter. In actual practice, during normal cable laying, the rate of pay-out may be controlled solely by the fore winch A, the aft winch B being closed on the cable with only a light gripping pressure and having its brake unapplied so that said aft winch only idles. Thus the aft winch B is ready to come into immediate operation should the fore winch A fail. It may be preferred, however, to make the two winches A and B share the load by setting the gripping pressure and brake effort of both to suitable values. This also will allow either winch to be brought up to full gripping pressure and braking effort at a moment's notice, should the other winch fail, without altering the speed of lay.

For bringing the contiguous runs of the chains 3 and 4 together and moving them apart, mechanical means are provided which will be described hereinafter. When said contiguous runs are brought together on the cable by said mechanical means, an added high pressure is provided by means of hydraulic pressure bags 10 and 11 located at the back of each of said contiguous runs. By applying air or liquid under pressure to these pressure bags, very high pressures can be set up between the friction blocks 9 and the cable 1, and, by removing such pressure and then moving the contiguous runs apart by said mechanical means, said contiguous runs are sufficiently far separated to enable a repeater 12 to pass between them (see Figures 6 and 8). It will of course be observed that the sprockets 5, 6 and 7, 8 of the two chains are permanently sufficiently far apart to enable a repeater or other solid object 12 easily to pass between them, and the movement of the contiguous runs of chains 3 and 4 either together or apart is rendered possible by virtue of slack in the chains.

The two endless chains 3 and 4 of each winch are arranged one above the other so that both chains and all the sprockets 5, 6, 7, 8 are in a common vertical plane. Two endless drag chains 13 and 14 are provided, one on each side of said common vertical plane. Each endless drag chain 13, 14 passes round fore and aft sprockets 15, 16, the fore one 15 of which is to the fore of the fore end of the fore winch A, and the aft one 16 of which is to the aft of the aft end of the aft winch B (see Figure 1). The two force sprockets 15 of the drag chains 13, 14 are fast on a common shaft 17 (Figure 8) which has a worm wheel on it (not shown) which is driven by a power driven worm. The upper runs of the two drag chains 13, 14 are at a level just below the normal level of the cable 1.

Some little time before a repeater 12 is due to be taken from the stowage tank, it is placed in a cradle 18 (Figures 12 and 13) and the cradle is lifted and suspended by overhead tackle 19 from a trolley 20 which runs on an overhead runway 21 leading from a position above the stowage tank to a position above the fore end of the drag chains 13 and 14. At this time the cable laying speed is reduced to walking pace, and when there is only ten to twenty fathoms of slack cable between the repeater 12 and the winches A and B, the cable laying speed is further reduced so that the bight in the cable can be taken up and the cradled repeater 12 moved off along the runway 21 without snatch.

When the aft end of the runway is reached, with the cradled repeater 12 above the fore end of the drag chains 13, 14, the aft winch B is brought to full pressure on the cable by means of the pressure bags 10 and 11 and is braked and the cable laying is accordingly stopped. At the same time the fore winch A is opened, and a multi roller unit 22 (Figure 1) located at the entry end of the fore winch A, through which the cable 1 normally passes to be pre-straightened and given an ensured tension between said unit and the stern 2 of the ship, is also opened and lowered to an out-of-the-way position as in Figure 1. This multi roller unit 22 consists of a plurality of V pulleys on each side of the cable. Said pulleys are normally closed together in unison to grip the cable between them and pre-straighten and tension it as stated. They can also be moved apart in unison, and the whole unit can be quickly lowered to said out-of-the-way position to make clearance for the cradle and repeater.

At this stage the fore winch brake is also freed.

The drag chains 13 and 14 are provided with dogs 23, 23a which cooperate with lugs 24 on the cradle to restrain movement of the cradle in the after direction, and, in the meantime the drag chains 13, 14 have been inched round by the power driven worm and worm wheel to bring the dogs 23 into position under and just in front of the lugs 24.

The cradle 18 is now lowered onto the upper runs of the drag chains 13, 14 with the lugs 24 just to the fore of the respective dogs 23, and the lifting tackle is removed. The brake of the aft winch B is now eased until the load on the cable 1 is taken up by the drag chains 13, 14 which are rendered immovable by the self sustaining worm wheel and worm. It will be understood that the repeater 12 must be held against movement to the aft relative to the cradle 18. This is effected by means of a hinged stopper plate 25 at the after end of the cradle, which has previously been closed to form an abutment for the after end of the repeater and is locked at its closed position by a wedge 26, all as will be more particularly described hereinafter.

The worm and worm wheel drive of the drag chains 13, 14 is now operated to enable the cable 1 to be slowly payed out until the cradled repeater 12 has passed through the fore winch A, and when said repeater is midway between the two winches, the drag chains are stopped. The fore winch A is then closed to grip the cable 1, and the said multi-roller unit 22 is raised and reclosed on the cable. The aft winch B is opened and its multi-roller unit (not shown), which is at the entry of said aft winch and is similar to that of the fore winch, is also opened and lowered to the out-of-the-way position.

The drive of the drag chains 13, 14 is now restarted allowing the cradled repeater 12 to pass through the aft winch B, and the drive is continued until the cradle 18 has been slid off the after end of the drag chains 13, 14 onto an off-loading ramp 27 (Figures 1 and 10) comprising two longitudinal rails. As the cradle 18 is passed onto this ramp 27 the fore winch A is braked to stop the cable laying, and, in case this braking should be misjudged, the off-loading ramp 27 has a stopping block 28 (Figure 10) fitted at its after end to act as an abutment stopping the cradle.

The wedge 26 which holds the hinged stopper plate 25 in position on the cradle 18 is now removed, and the aft winch B is closed onto the cable 1 with light pressure and its multi-roller unit is raised and reclosed on the cable. The brake of the fore winch A is then eased allowing the repeater 12 to move slowly aft away from the cradle.

Figure 1:
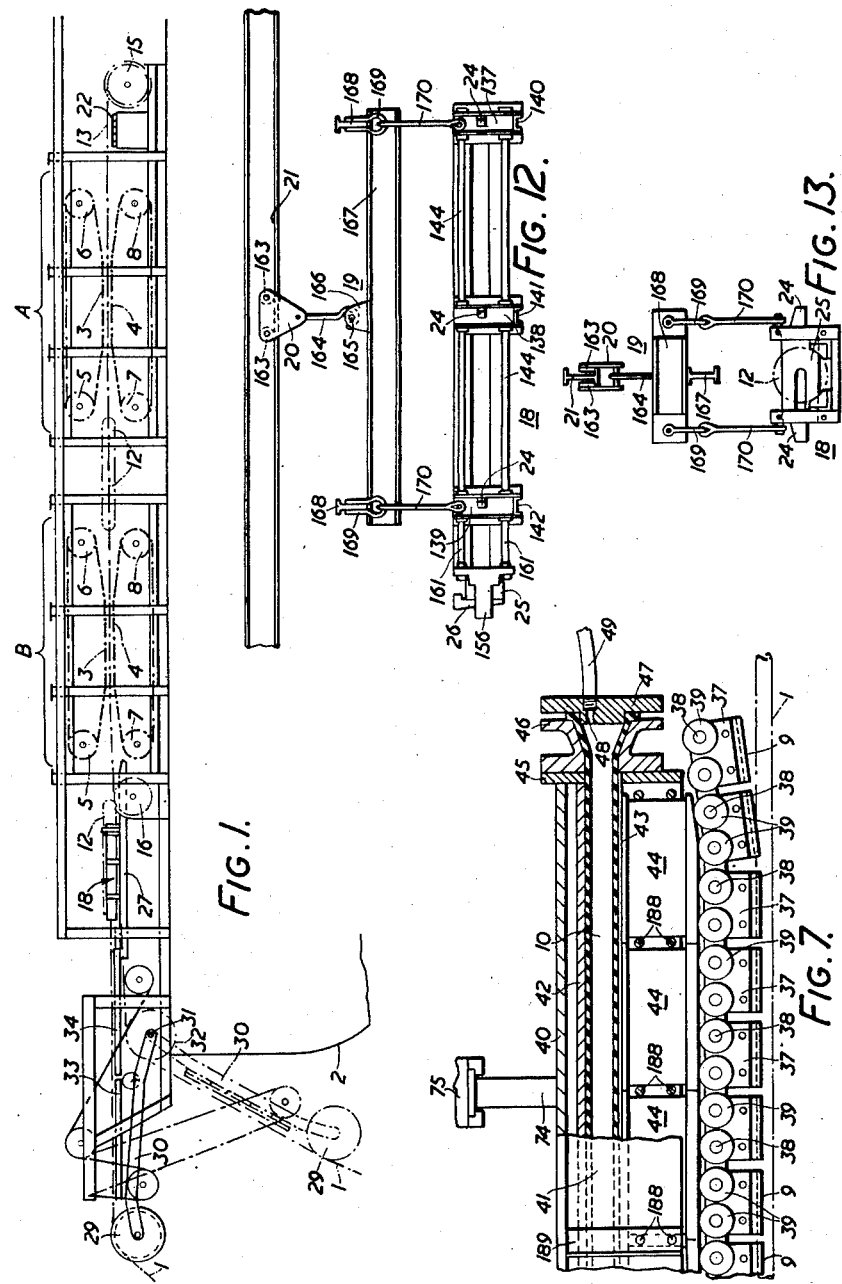
Figure 1 is a somewhat diagrammatic elevational view of the general arrangement of the apparatus.

The guiding of the cable over the stern 2 of the ship is effected by means of a guide pulley 29 (Figures 1, 10 and 11) mounted at the after end of a frame structure 30 which projects rearwardly from the stern of the ship. This frame structure is pivotally mounted about an axis 31 at its forward end so that it can be tilted downwards from its normal roughly horizontal position to the position shown in chain dotted lines in Figure 10. A second guide pulley 32 is mounted coaxially with said axis 31. This is normally inoperative being immediately beneath but out of contact with the cable 1 as shown in Figures 1 and 10.

A launching platform consisting of two parallel rails 33 is mounted on said frame structure 30, and an intermediate platform consisting of two parallel rails 34 is fixedly mounted so as to bridge the gap between the off loading ramp 27 and the rails 33.

Figure 10:
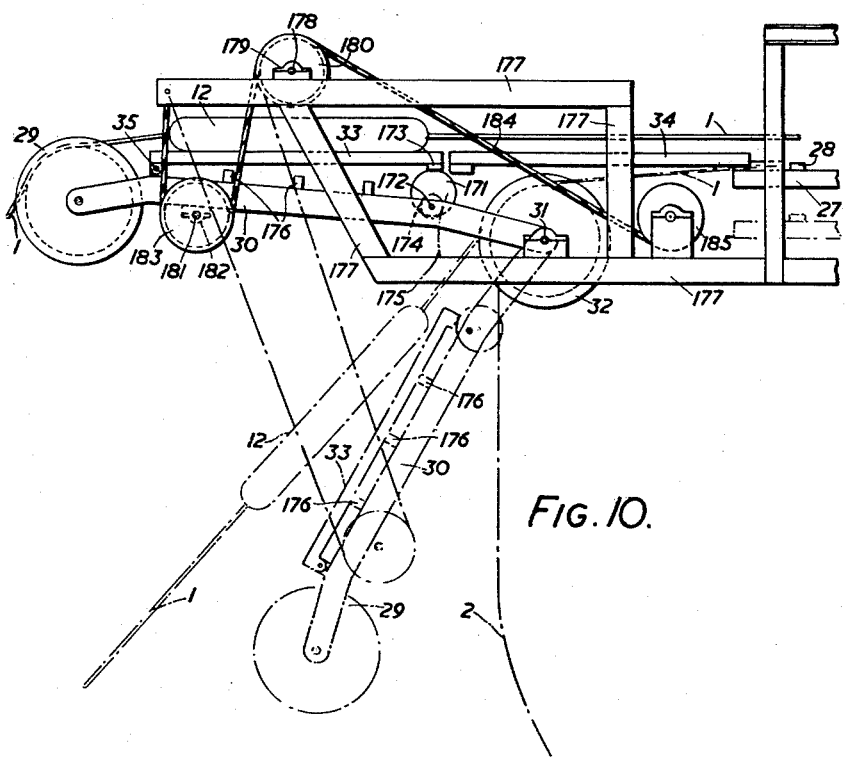
Figure 10 is an elevation of the part of the apparatus shown at the left hand end of Figure 1.
Figure 11:
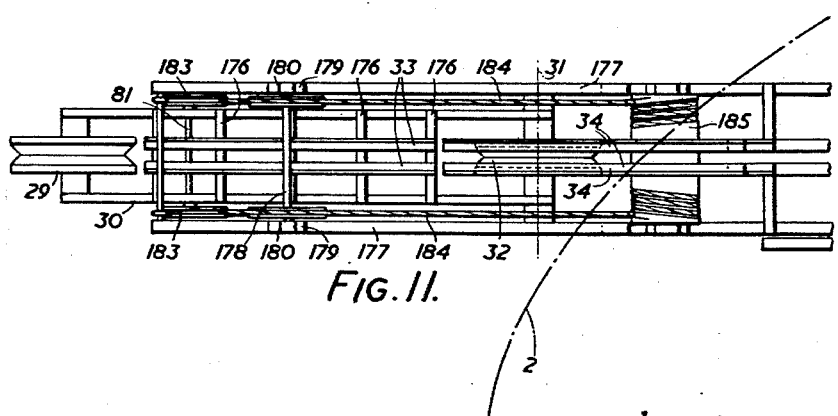
Figure 11 is a plan of the same.
Figure 14:
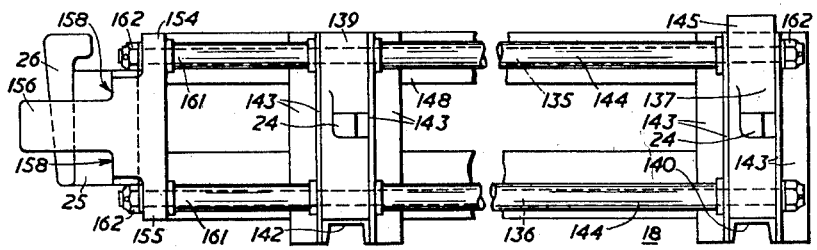
Figure 14 is an elevation of said cradle shown on a larger scale.
Figure 15:
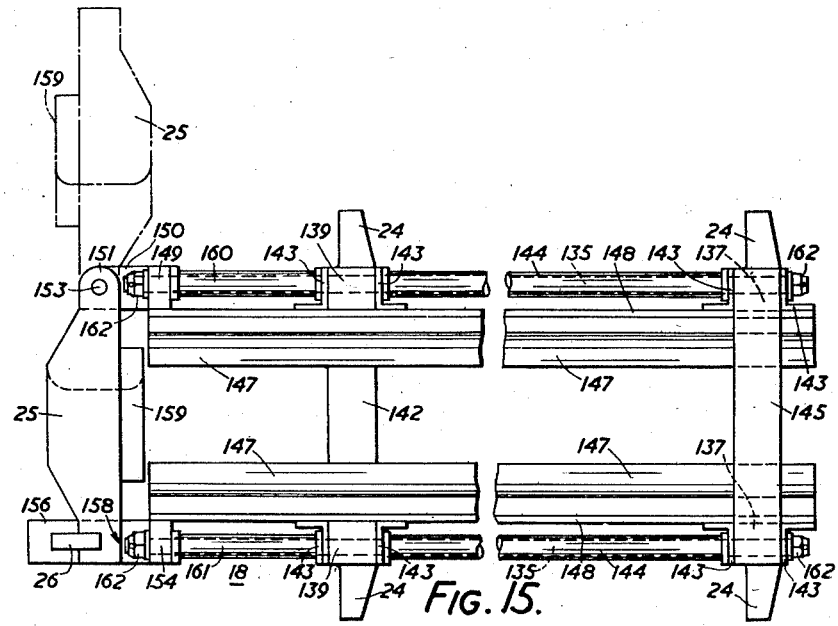
Figure 15 is a plan of the same.

The operation last described (i. e. the easing of the brake of the fore winch A to allow the repeater 12 to move aft away from its cradle) is continued until said repeater has passed over the rails 34 and fully on to the rails 33, as shown in Figure 10.

The rails 33 are hinged at their forward end at 35 relative to said frame structure 30 so that they can be raised slightly and adjusted into correct alignment with the fixed rails 34. This will be more particularly described hereinafter.

At this point the off loading ramp 27 is lowered to the chain-dotted position of Figure 10 so that the cradle 18 shall be clear of the cable 1 during the subsequent operations.

The repeater 12 being fully on the rails 33, the fore winch A is braked fully to stop the cable laying and the frame structure 30 is then lowered about its pivot axis 31, until the rails 33 reach and slightly pass the catenary angle of the cable leaving the ship, say as at the chain dotted position of Figure 10. During this operation the repeater 12 will be lowered with said rails 33. Shortly after the commencement of the operation, the cable 1 will engage the second guide pulley 32 at a point to the fore of the repeater 12 as shown in chain dotted lines, and, at the end of the operation, the first guide pulley 29 will disengage the cable and the rails 33 will move a little away from the repeater 12 which will now be supported solely by the taut cable 1 as shown in Figure 10.

The ship's speed can now be brought up to operational level, and, at the same time, the brake of the fore winch A is eased until the fore winch is again controlling the rate of lay.

The cable is now being guided over the stern 2 of the ship by the second guide pulley 32. At some time before another repeater 12 is to be launched, the frame structure 30 must be raised to its original position, so that the first guide pulley 29 again engages the cable 1 which becomes again raised a little above the second guide pulley 32. All is now ready for the launching of another repeater 12 in the same manner as above described.

For returning the cradle 18 from the off loading ramp 27 to the neighbourhood of the stowage tank a second overhead runway (not shown) is provided which runs back to the stowage tank at the side of the apparatus.

During cable laying as heretofore described, the cable 1 passing over the stern 2 of the ship is under tension and the function of the winches A and B is to put a brake on the cable so as to pay it out at the appropriate speed. During the initial stages of a cable laying operation, however, it is necessary for the winches A and B to be positively driven, and to this end, a power unit (not shown) is provided, and the winches have respective clutches 36 by which they can be selectively coupled to said power unit.

At the start of a cable laying operation the cable 1 will be all coiled in the storage tank and it is necessary to attach the end of the cable to some fixed connecting point outside the ship such as a buoy.

To start the operation a suitable hawser, with a swivel shackle is attached to the free end of the cable in the stowage tank. Said hawser is then laid out aft along the deck and passed through both winches A and B which are both open and unbraked. The aft winch B is then closed to grip the hawser, the power unit is started, and the aft winch clutched by its clutch 36 to said power unit so that it pulls the hawser, and therefore the cable 1, aft. This is continued until the shackle has passed through the fore winch A.

At this point, when the shackle is midway between the two winches, the power unit is stopped, and the multi-roller unit 22 at the entry to the fore winch is raised from its lowered position and closed around the cable 1. The fore winch A is closed to grip the cable; the aft winch B is opened and declutched by its clutch 36 from the power unit, and the fore winch is clutched by its clutch 36 to the power unit.

The power unit is then started and the cable 1 is hauled aft until the shackle is clear of the exit end of the aft winch B. The power unit is then stopped, and the shackle and hawser removed. The multi-roller unit at the entry end of the aft winch B is raised from its lowered position and closed around the cable. For safety reasons the aft winch B is closed on the cable but only a light gripping pressure is applied and its brake is rendered inactive. The aft winch B is now in a position of immediate readiness should the fore winch A fail.

Next the power unit is started and the aft winch is clutched to it by its clutch 36, and thus the cable 1 is fed aft over the pulley 29 to the connecting point. The power unit is stopped and the connection of the cable 1 to said connecting point is made at the site.

The power unit is again started, and, at the same time, way is put on the ship, up to a speed of about five knots. The winch and ship speeds are synchronised.

When sufficient cable 1 has been payed out the brake of the fore winch A is applied and the power unit is stopped. Both winches are declutched by their clutches 36 from said power unit. From now on the cable 1 is payed out under its own tension with the fore winch A controlling the rate of payout and with the aft winch B idling at the same speed, as heretofore described.

Figure 5:
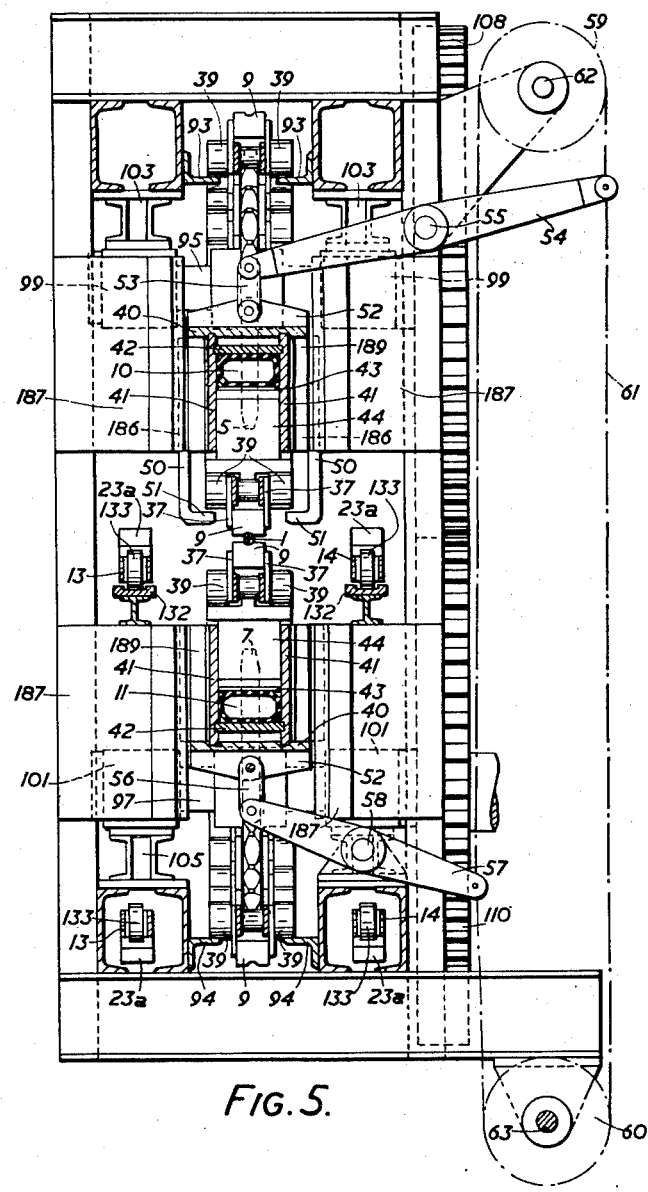
Figure 5 is a section on line V—V of Figure 2.

Describing now in more detail the winches A and B, each of the endless chains 3, 4 are essentially chains of the ordinary bicycle chain type but the outer plates 37 of the chain (Figures 5, 6 and 7) are extended in the direction to the inside of the loop, and the pads 9 are mounted between the extended portions of said plates 37 as clearly shown. The ends of the pivot pins 38 of the chain are extended beyond the plates 37 and have rollers 39 mounted on their extending portions at both sides.

Each of the contiguous or operative runs of the endless chains 3 and 4 is backed by means of a horizontal beam unit, the arrangement being such that the upper beam unit is above the operative run of the upper chain 3, and lower beam unit is below the operative run of the lower chain 4. To bring said operative runs together, the upper beam unit is lowered and the lower beam unit raised, and, to move said operative runs apart, the upper beam unit is raised and the lower beam unit lowered. The beam units include within themselves the respective pressure bags 10 and 11.

More particularly the upper beam unit comprises an elongated horizontal box-like structure consisting of a horizontal top plate 40 and two side plates 41 depending downwards from said top plate. A little below said top plate 40 is an inner plate 42 which is parallel to said top plate and bridges the side plates 41 and is rigidly secured to them. Immediately beneath the inner plate 42 is the pressure bag 10, which extends the full length of said box-like structure, and immediately beneath said pressure bag, with a thin flexible wearing plate 43 in between, are a series of plunger blocks 44.

These plunger blocks 44 are of the general form of solid rectangles. They abut together end to end to form what is virtually a continuous horizontal beam. Their main portions make a sliding fit between the side plates 41. Their upper surfaces abut flush against the wearing plate 43 and their lower surfaces, which project beneath the side plates 41, together form a pressure track along which the rollers 39 can roll. Details of the shape of these plunger blocks 44 are deemed clear from the drawings and especially Figures 5, 6 and 7.

The ends of the box-like structure are closed by means of end plates 45 (Figure 7) and one of said end plates has a hole through it, through which the pressure bag 10 at that end passes. The end portion of said pressure bag, which projects through said hole is surrounded by a supporting member 46, mounted on said end plate 45, and the mouth of the pressure bag at that end is closed by means of a closure element 47. Said closure element 47 has an inlet port 48 in it which communicates with an external supply pipe 49. The other end of the pressure bag 10 is closed. The lower beam unit is the same as the upper beam unit except that it is inverted with respect to said upper beam unit. The same references have been used to designate corresponding parts of said two beam units.

In the case of the upper beam unit, two outer retaining plates 50 (see also Figure 8) are provided which are secured to the side plates 41 and extend downwards and have inwardly projecting flanges 51 at their lower edges which extend underneath the rollers 39. When the beam units are moved together, and the pads 9 are gripping the cable 1, these flanges 51 are clear of the rollers 39, but when the beam units are moved apart, the upper beam unit being at its raised position, said flanges 51 engage under the rollers 39 and ensure that the operative run of the chain 3 shall be raised with said upper beam unit. No retaining plates 50 are necessary in the case of the lower beam unit, as gravity will cause the operative run of the chain 4 to be lowered with lower beam unit, with the rollers 39 maintaining contact with the plunger blocks 44.

For moving the beam units away from, and towards, one another, the plate 40 of each beam unit is formed with two lugs 52, one at each end. Each lug 52 of the upper beam unit is connected by means of a link 53 to one end of a lateral lever 54 pivoted at 55 between its ends to the fixed supporting structure, and each lug 52 of the lower beam unit is connected by means of a link 56 to one end of a lateral lever 57 pivoted at 58 between its ends to said fixed supporting structure. Beside each end of the beam units is mounted a pair of sprockets 59 and 60 one above the other, said sprockets being mounted on said fixed structure, and an endless chain 61 runs on the sprockets of each pair. At each end of the units, the end of the lever 54 remote from the link 53 is connected to the more distant vertical run of the chain 61 at that end, and the end of the lever 57 remote from the link 56 is connected to the near vertical run of said chain 61. The sprockets 59 are fast on a common shaft 62 and the sprockets 60 are fast on a common shaft 63, and thus the two chains 61 must move in unison.

It will now be seen that when the sprockets are rotated in one direction the levers 54 will be rotated in the direction for raising the upper beam unit, and the levers 57 will be rotated in the direction for lowering the lower beam unit, and the beam units will accordingly be moved apart. When said sprockets are rotated in the other direction, the direction of rotation of said levers 54 and 57 will be reversed and the beam units will be moved towards one another.

Figure 2:
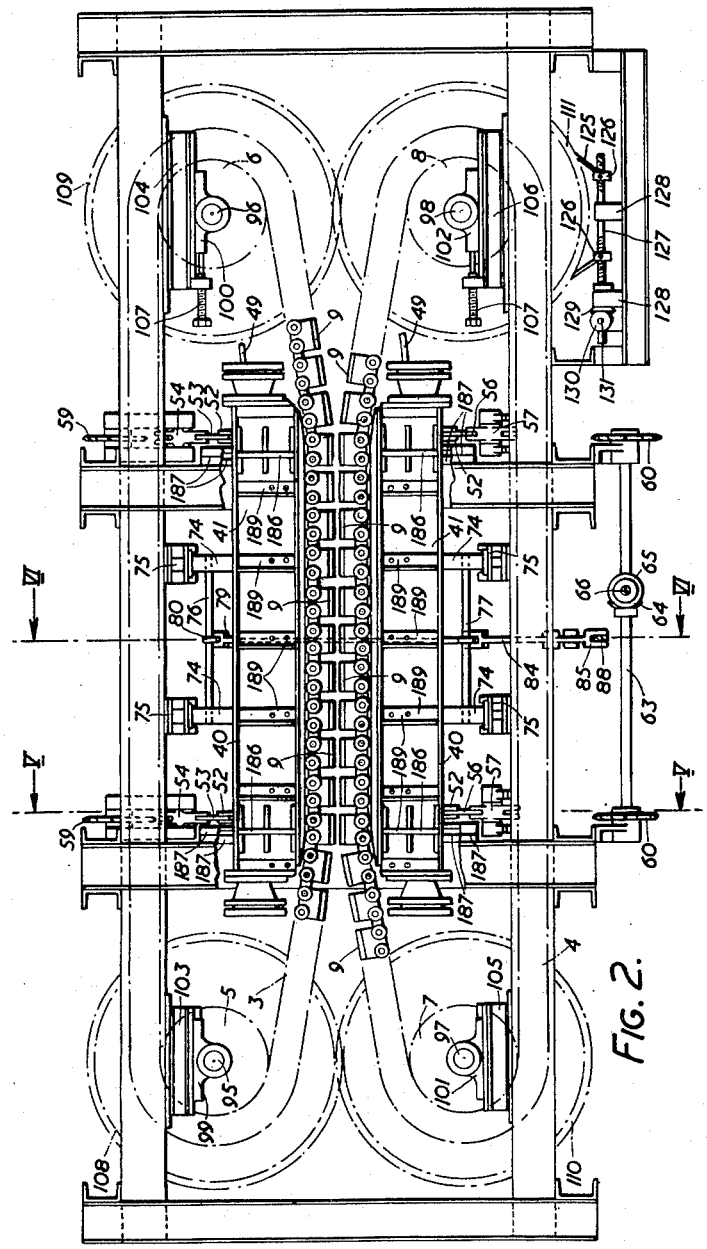
Figure 2 is an elevation of one of the winches employed in the apparatus, with parts broken away or omitted for clearness.

For rotating the sprockets 59 and 60, the shaft 63 has a bevel gear 64 mounted fast on it (Figures 2 and 3) which is in mesh with a bevel gear 65 fast on a transverse horizontal shaft 66. Said shaft 66 is coupled, through bevel gears 66a and 67a (Figure 4) to the lower end of a vertical shaft 67 (Figures 3 and 4) which runs in a vertical pillar 68. A worm wheel 69 is mounted fast on the upper end of said shaft 67 and this is in mesh with a worm 70 fast on a shaft 71 which runs in a bearing 72 mounted on said pillar. A hand wheel 73 is mounted fast on the end of said shaft 71, and it will be seen that, by rotating said hand wheel, the sprockets 60 and 59 are rotated at high mechanical advantage. When the beam units are moved towards one another to the position at which the blocks 9 grip the cable 1, it is necessary that they shall be positively supported against movement away from one another by supporting means which will resist the subsequent high pressure exerted, as will be hereinafter described, by the pressure bags 10 and 11. This positive support is effected by means of two pillow blocks 74 for each beam unit, which pillow blocks are slidable laterally in slideways formed in massive bed blocks 75 which are mounted on the fixed structure. The bed blocks 75 in the upper beam unit are of course above their pillow blocks 74, and to support said pillow blocks slidably from said bed blocks, the guideways in the under surfaces of said bed blocks have undercut sides which mate with side flanges formed on said pillow blocks. The bed blocks 75 for the lower beam unit are below their pillow blocks 74, but in this case also the guideways in the upper surfaces of said bed blocks are undercut and mate with side flanges on the pillow blocks. It will be observed that, in Figures 6 and 8, the beam units have been moved apart from each other, and the pillow blocks 74 are therefore withdrawn sideways from the path of said beam units. In Figures 2 and 7, the beam units have been moved towards one another to the gripping position and the pillow blocks 74 have been moved between the plates 40 and the bed blocks 75.

Figure 6:
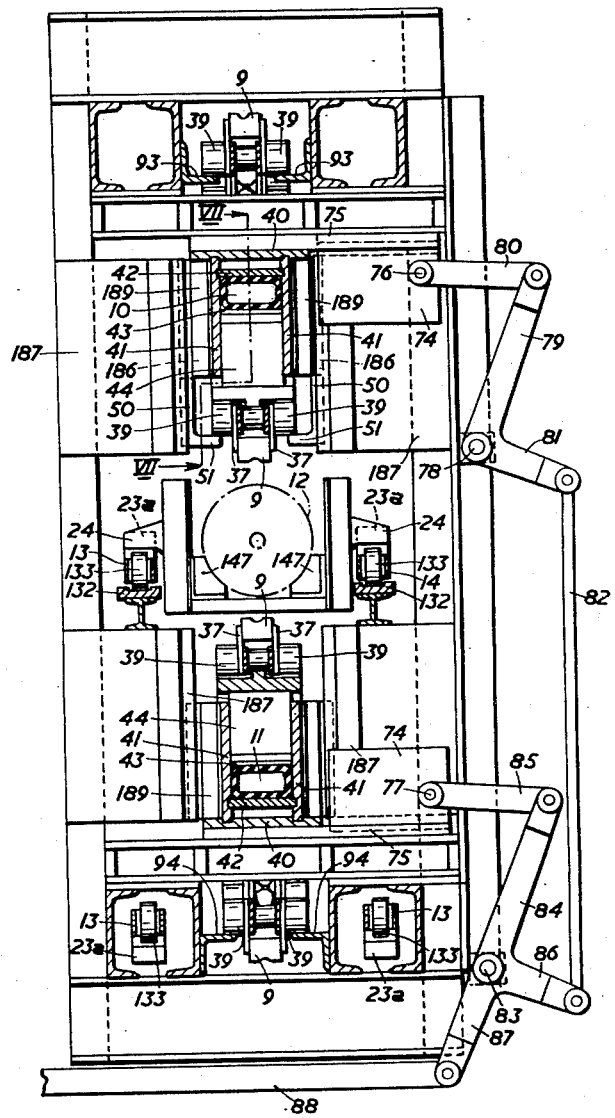
Figure 6 is a section on line VI—VI of Figure 2.

For effecting the sliding movement of the pillow blocks 74, the upper pillow blocks are coupled together by means of a rod 76, and the lower pillow blocks are coupled by means of a rod 77 (Figures 2 and 6). A bell crank lever pivotally mounted at 78 to the fixed structure has one arm 79 connected through a link 80 to the mid point of the rod 76 and the other arm 81 connected to the upper end of a vertical connecting rod 82. A second bell crank lever pivotally mounted at 83 to the fixed structure has one arm 84 connected through a link 85 to the mid point of the rod 77 and the other arm 86 connected to the lower end of said connecting rod 82. This last bell crank lever has a tail extension 87 of the arm 84 beyond the pivot point 83, and said tail extension is connected to one end of a horizontal transverse rod 88. Said rod 88 passes to the other side of the machine and the end thereof remote from said machine is pivotally connected to the lower end of a hand lever 89 (Figures 3 and 4) pivotally mounted at 89a between its ends on the aforesaid pillar 68. The upper end of said lever 89 is formed as a handle 90, and it will be seen that by rocking said lever 89 in one or other direction, the rod 88 is moved longitudinally of itself in one or other direction and therefore the bell crank levers are rocked in one or other direction and the pillow blocks 74 are slid in one or other direction.

Figure 8:
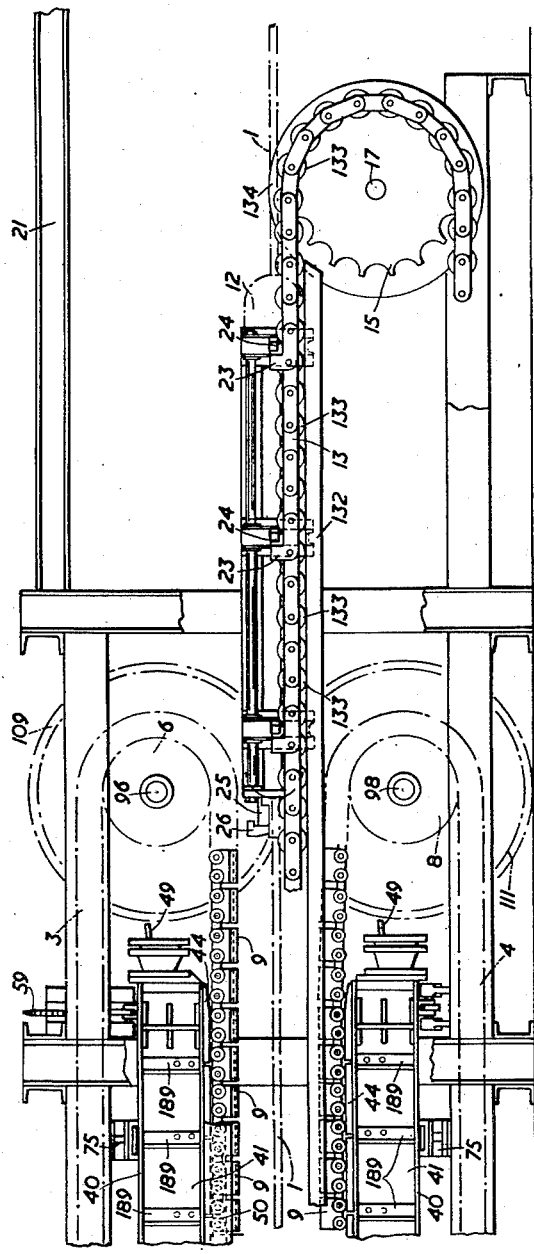
Figure 8 is an elevation of the part of the apparatus shown at the right hand end of Figure 1.
Figure 9:
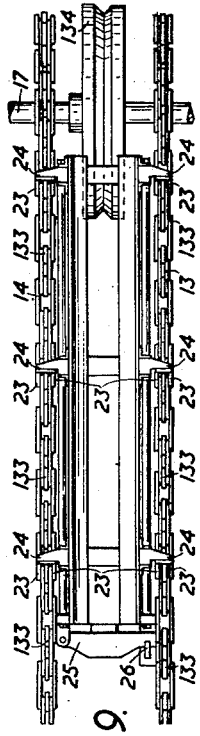
Figure 9 is a plan of a portion of the apparatus of Figure 8.

It will now be seen that, assuming the beam units and therefore the operative runs of the chains 3 and 4 to be apart from each other as in Figures 6 and 8, to bring said beam units and operative runs together to the full gripping position, the wheel 73 is first actuated to bring the beam units together, and thereby the blocks 9 will be brought into light contact with the cable 1. Next the pillow blocks 74 are slid into position between the plates 40 and the bed blocks 75, by means of the hand lever 89, and thereby the return of the beam units is positively prevented. Next fluid under pressure is admitted to the pressure bags 10 and 11 by way of the pipes 49, and this causes said pressure bags to expand and thereby press the plunger blocks 44 downwards in the case of the upper beam unit and upwards in the case of the lower beam unit, and thereby, through the rollers 39, the operative runs of the chains 3 and 4 are pressed together so that the pads 9 grip the cable between them with a very high pressure. It will be seen that the rollers 39 can roll along the surface of the plunger blocks 44 even when there is a high degree of thrust between said rollers and plunger blocks. It will be appreciated that, by employing a plurality of plunger blocks 44 instead of one continuous plunger block, any dimensioned irregularities in the chain or pads 9 or even the cable are accommodated and a high gripping pressure is ensured throughout the length of the operative runs of chain.

To prevent undue sagging of the remote or nonoperative runs of the chains 3 and 4, the rollers 39 of the upper run of the upper chain 3 roll along runways 93 mounted fast on the fixed frame structure and, the rollers 39 of the lower run of the lower chain 4 roll along runways 94 mounted on the fixed frame structure.

The sprockets 5, 6, 7 and 8 are mounted fast on respective shafts 95, 96, 97 and 98 which run in bearings 99, 100, 101, 102 supported by brackets 103, 104, 105, 106 mounted on the fixed structure. In order that the tension of the chains may be adjusted, the bearings 100 and 102 are slidably adjustable with respect to their supporting brackets 104, 106, the adjustment being effected by means of screws 107 (Figure 2). In order to ensure that the chains 3 and 4 must move in complete unison the shaft 95, 96, 97 and 98 has gear wheels 108, 109, 110 and 111 mounted fast on them, the gear wheel 108 being in mesh with the gear wheel 110 and the gear wheel 109 being in mesh with the gear wheel 111.

Figure 3:
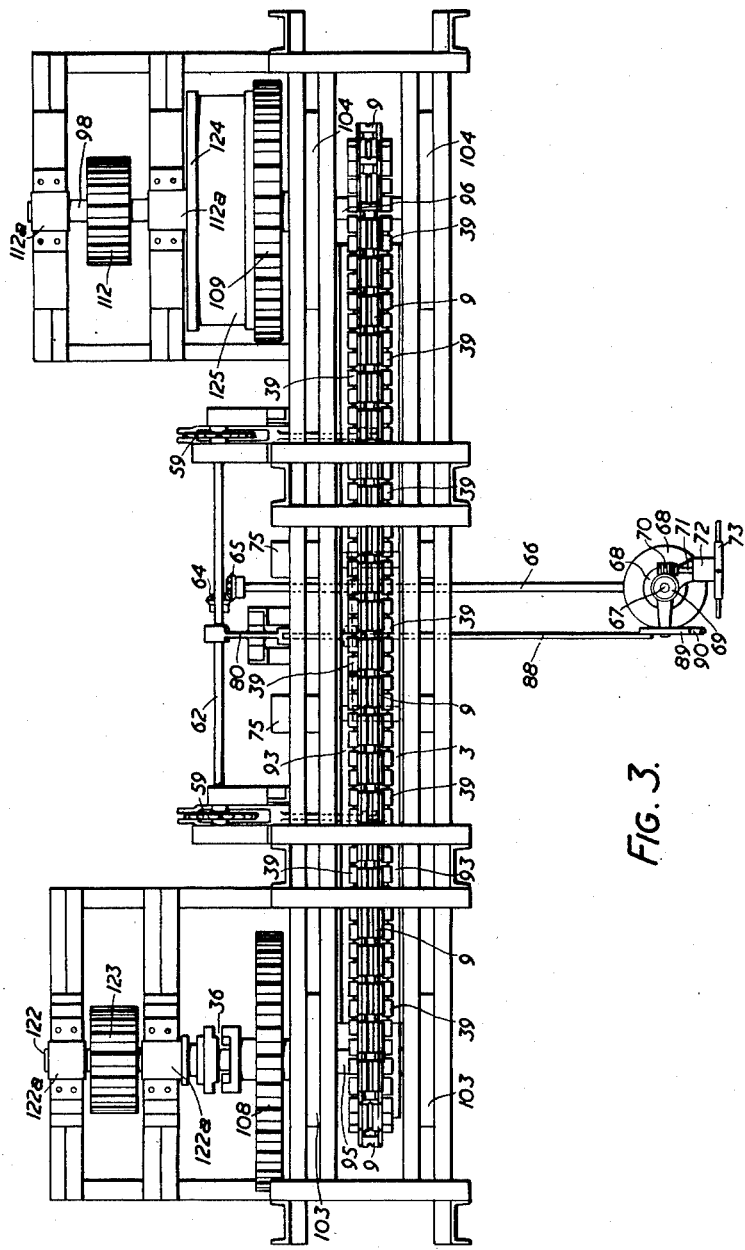
Figure 3 is a plan of said winch.

For braking the winch and thereby resisting the tension of the cable and paying it out at a controlled speed as heretofore described, the shaft 98 is extended and has fast on its extended portion a gear wheel 112 (Figure 3). Additional bearings 112a mounted on the fixed structure are provided for the extended portion of the shaft 98. This gear wheel 112 is connected through a gear train, not shown, to the shaft 113 of a rotary hydraulic pump 114 (Figure 17). Said pump 114 is a positive displacement pump. It takes in from a tank 115 by way of a pipe 116 and delivers back to said pump by way of pipes 117 and 118, the pipe 118 having a screw-down valve 119 connected in it. In parallel with the pipe 118 is a pipe 120 which has a relief valve 121 connected in it. When it is desired for the winch to idle, the screw-down valve 119 is adjusted to its wide open position, and oil can accordingly circulate freely from the tank 115, through the pipe 116, the pump 114 and the pipes 117 and 118 back to said tank, and no appreciable resistance is offered to the rotation of the pump and therefore to the running of the winch. When it is desired to apply a brake to the winch the screw-down valve 119 is closed, more or less according to the degree of braking required, and resistance is offered to the circulation of the oil and therefore to the rotation of the pump and the running of the winch. When the valve 119 is fully closed the winch is fully braked except that, in the event of excessive tension being applied to the cable, which might cause parting of the cable or damage, say, to the pads 9, the relief valve 121 will open and enable the circulation to proceed, and therefore the winch to run, under very high tension of the cable.

Figure 4:
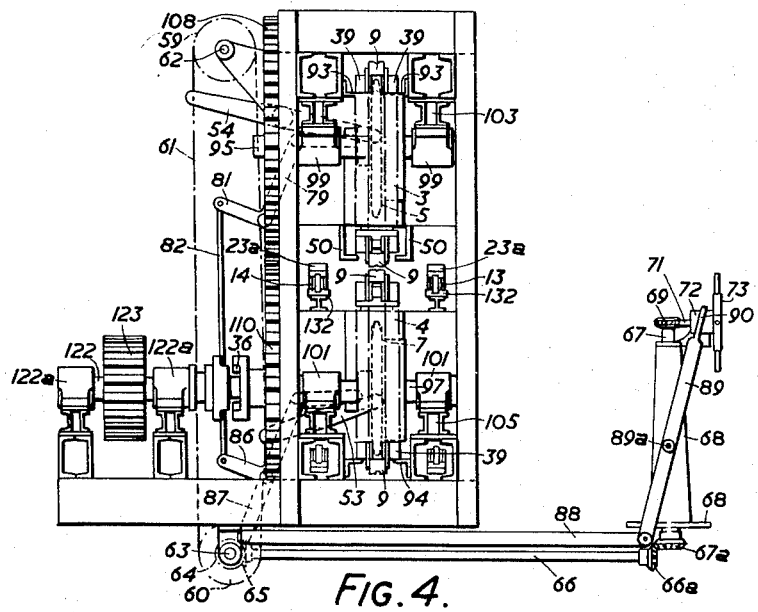
Figure 4 is an end elevation of the same looking from the left of Figure 3.

It will be seen that the aforesaid clutch 36 is a dog clutch which is adapted to couple the shaft 97 to a shaft 122 on which is mounted a gear wheel 123 (Figures 3 and 4). Gear trains extend from the gear wheels 123 of the two winches to a common prime mover and it will be seen that by means of the clutches 36 either or both of the winches can be coupled to the prime mover at will. The reference 122a designates the bearings for the shaft 122 mounted on the fixed frame structure.

In addition to the hydraulic braking means, mechanical braking means are also provided for the winch. To this end a brake drum 124 (Figure 3) is mounted fast on the shaft 96 adjacent to the gear wheel 111. A brake band 125 (Figure 2) encircles said brake drum 124 and has its ends connected to nuts 126 which engage with right and left hand screws on a rod 127 which rotates in fixed bearings 128. A bevel gear 129 on said rod 127 meshes with a bevel gear 130 on a shaft 131. An operating handle (not seen) is mounted on said shaft 131, and it will be seen that by rotating said handle in one or other direction the brake band 125 is tightened or loosened on the drum 124, thereby braking or releasing the winch. These mechanical braking means may be regarded as emergency means, and are not intended to be employed in ordinary circumstances.

The drag chains 13 and 14 are of the bicycle chain type, the dogs consisting of upward extensions 23 from the outer side plates and angle section pieces 23a secured to said extensions. The upper runs of the drag chains, which support the cradle 18 are themselves supported by running along fixed runways 132 supported from the fixed frame structure. Said drag chains have rollers 133 on their pivot pins which enable them to run freely on said runways. The shaft 17 midway between the sprockets 15 has a V pulley 134 mounted on it which forms a guide for the cable 1 as indicated in Figure 8.

The cradle 18 is an elongated structure consisting of two longitudinal rods 135 and 136 one above the other on each side, three uprights 137, 138, 139 on each side joining the longitudinal rods, and three lateral members 140, 141, 142 joining the lower ends of the opposite pairs of uprights. The uprights 137, 138, 139 are massive rectangular-section members, and the lugs 24 project integrally from these members. Each of the uprights 137, 138, 139 has two angle-section members 143 secured flush to its fore and aft surfaces as clearly shown. The longitudinal rods 135 and 136 pass through holes in said uprights and angle-section members, and distance sleeves 144 on said longitudinal rods serve to space the uprights at the appropriate distance. The angle-section members 143 extend downwards beyond the lower ends of the uprights 137, 138, 139, and the lateral members 140, 141, 142, which consist of channel-section members are secured in the inverted position between the angle section members 143 and against the bottoms of the uprights as clearly shown. The forward pair of uprights 137 are shortened at their upper ends and have a hinged bridge member 145 connected across their upper ends. Secured to the angle section members 143 and the lateral members 140, 141, 142, as clearly shown, are two longitudinal angle section members 146, and, nesting in these angle section members 146 are two longitudinal blocks 147 of, say, wood with part-cylindrical surfaces for receiving the repeater 12. Before the repeater is placed in position on these blocks 147 the hinged bridge member 145 is raised on its hinges, and, when said repeater is in place it is lowered and fastened at its normal position. Its under side is formed, as clearly shown in Figure 16, to fit the upper surface of the repeater and thus the repeater is held down firmly on the blocks 147. The reference 148 designates a strengthening plate on each side secured to the angle section members 143 at the top.

Figure 16:
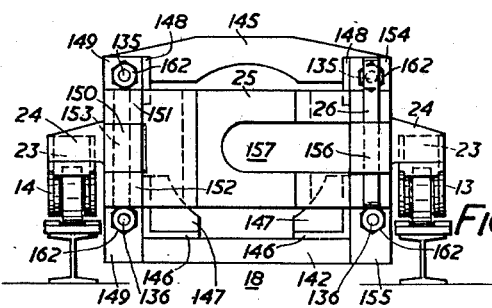
Figure 16 is an end elevation of the same viewed from the left of Figure 15.

Mounted on the aft ends of the rods 135 and 136 on one side is the stationary element of the hinge by which the aforesaid stopper plate 25 is hinged. This consists of a vertical bar 149 whose upper and lower ends have holes which receive the rods 135, 136, and which has an integral aftwards projection 150 about midway of its height. The hinge lugs 151 and 152 of said stopper plate extend above and below said projection 150 as shown in Figure 16, and the hinge pin 153 passes vertically through said hinge lugs 151 and 152 and said projection 150, and thus the stopper plate is hingedly mounted.

Mounted on the aft ends of the rods 135 and 136 on the other side is the stationary element for the fastening of the stopper plate 25. This is an integral element having upper and lower lugs 154 and 155 which have holes by which they are threaded onto the rods 135 and 136 and an aftwards projection 156 which, when said stopper plate is closed, projects through a slot 157 in said stopper plate. Said stationary fastening element also has shoulder surfaces 158 against which the stopper plate, above and below the slot 157 abuts when closed. Said projection 156 has a hole through it through which the wedge 26 passes behind the stopper plate, thereby securing said stopper plate in the closed position. The inner surface of said stopper plate 25 has a hardwood facing 159 against which the end of the repeater 12 is adapted to abut.

Spacing sleeves 160, on the rods 135 and 136 on the one side, space the vertical bar 149 from the next adjacent upright 139 on that side, and spacing sleeves 161, on the rods 135 and 136 on the other side, space the lugs 154 and 155 from the next adjacent upright on said other side. Nuts 162 are screwed on the ends of the rods and thus the structure is united into a rigid structure as will be clear.

The overhead tackle 19 for suspending the cradle 18 from the overhead runway 21 is deemed clear from Figures 12 and 13. The overhead runway 21 is an I section girder, and the trolley 20 has wheels 163 which run on the underneath flange of said girder 21 on opposite sides of the web. A hook 164 depending downwards from said trolley 20 hooks on to a cross rod 165 supported between lugs 166 projecting up from the middle of a length of I section girder 167. On the top of said girder 167 at each end are mounted two cross bars 168, and links 169 which depend down from the two ends of each of these cross bars are coupled in turn to links 170 which are connected to the upper ends of the uprights 137 and 139 of the cradle as shown.

The means for adjusting the rails 33 about the axis 35 comprise an eccentric cam 171 (Figure 10), fast on a shaft 172 rotatably mounted on the frame structure 30, and supporting, with its cam surface, the underside of a cross bar 173 on the underside of the rails 33 at their forward end. Fast on said shaft 172 is pinion 174 and this is in engagement with a fixed toothed quadrant 175. The cam 171 is adjusted, so that, when the frame structure is at the up position shown in full lines in Figure 10, it supports the rails 33 in alignment with the fixed rails 34. When the frame structure 30 moves down to the chain-dotted position of Figure 10, the pinion 174, and therefore the cam 171, are rotated by the engagement of said pinion with the quadrant 175, and thus the rails 33 are lowered about the axis 35. When they are lowered sufficiently to rest on the cross members 176 of the frame structure 30, the pinion 174 clears the lower end of the quadrant 175, so that subsequently said rails 33 remain resting on said cross members 176. It will be clear from the drawing that this enables the repeater 12 to clear the rails 33 earlier than it would otherwise do, that is to say with a considerably smaller downward movement of the frame structure 30. It will be obvious that, at any time when the pinion 174 is clear of the quadrant 175, the cam 171 can be adjusted so that the rails 33 are at the correct position relative to the rails 34 when the frame structure 30 is at the up position.

For raising and lowering the frame structure 30, a fixed jib structure is erected at the stern of the ship the members of which are all designated by the reference 177. Mounted on a common transverse shaft 178 which rotates in bearings 179 on said jib structure are a pair of pulleys 180, and, mounted on a transverse shaft 181 which rotates in bearings 182 on the underside of the frame structure 30 are a pair of pulleys 183. Two hawsers 184, secured to the end of the jib structure 177, pass down underneath the respective pulleys 183, and then up over the respective pulleys 180, and then forwardly and downwardly to be wound on a common drum 185 on the ship's deck. It will be clear that, by rotating said drum 185 in the direction to wind up the hawsers 184, the frame structure 30 will be raised, and, by rotating said drum in the direction to pay out said hawsers 184 said frame structure 30 will be lowered.

Returning to the construction of the winches, each beam unit is guided to move in a vertical path when raised and lowered by the levers 54 and 57 by the engagement of vertical ribs 186 (Figures 2, 5 and 6), which project outwards from each side plate 41 near its two ends, in vertical grooves formed in blocks 187 mounted fast to the fixed frame structure at the sides of the beam unit.

It will be seen (see especially Figure 7) that the plunger blocks 44 abut against each other end to end only at their top and bottom portions, their ends between their top and bottom portions being cut away to form parallel sided vertical clearances between said plunger blocks. Passing laterally through these clearances are horizontal guide bars 188, there being two of such bars in each clearance one near the top and one near the bottom. These bars extend between the side plates 41 and they serve at their ends to secure angle section strengthening members 189 to the outer surfaces of said side plates (Figures 5, 6, 2 and 8).

It will thus be seen that each plunger block is guided independently in the slight vertical movement which it makes relative to the beam unit under the influence of the pressure bag.

It will be clear that it would be possible to arrange that one of the contiguous runs of the chains 3 and 4 is supported by a stationary backing instead of the plunger blocks 44 and only the other contiguous run is movable as heretofore described away from and towards the former contiguous run.

I claim:

1. A device for paying out from a ship a submarine cable which may have a solid object connected in it, comprising a pair of endless bands, wheels on which said endless bands run so as to provide contiguous runs of said endless bands, tracks extending alongside said contiguous runs respectively, each track being on the side of its contiguous run opposite to the other contiguous run, fixed bearings for each wheels located so that the wheels of the two endless bands are sufficiently far apart to provide a slack in at least one of the endless bands and enable a solid object to pass between them, means for moving said tracks relatively together and thereby pressing said contiguous runs together by virtue of the slack in at least one of the endless bands while said bearings remain stationary, for gripping the cable longitudinally between said contiguous runs, means for controlling the rotation of at least one of said wheels, whereby said cable is payed out in a controlled manner, means for moving said tracks, together with said runs, relatively apart, by virtue of the slack in at least one of the endless bands, while said fixed bearings remain stationary to enable a solid object to pass longitudinally between said wheels and said contiguous runs, and an additional paying out device for paying out the solid object while said solid object is being passed between said contiguous runs.

2. A device for paying out from a ship a submarine cable which may have a solid object connected in it, comprising a pair of endless bands, wheels on which said endless bands run so as to provide contiguous runs of said endless bands, tracks extending alongside said contiguous runs respectively, each track being on the side of its contiguous run opposite to the other contiguous run, fixed bearings for said wheels located so that the wheels of the two endless bands are sufficiently far apart to provide a slack in at least one of the endless bands and enable a solid object to pass between them, means for moving said tracks relatively together and thereby pressing said contiguous runs together by virtue of the slack in at least one of the endless bands while said bearings remain stationary, for gripping the cable longitudinally between said contiguous runs, means for controlling the rotation of at least one of said wheels, whereby said cable is payed out in a controlled manner, means for moving said tracks, together with said runs, relatively apart, by virtue of the slack in at least one of the endless bands, while said fixed bearings remain stationary to enable a solid object to pass longitudinally between said wheels and said contiguous runs, and an additional paying out device for paying out the solid object while said solid object is being passed between said contiguous runs, said additional paying out device comprising an endless drag chain, sprocket wheels on which said endless drag chain runs, a cradle adapted to receive said object, means for coupling said cradle to a run of said drag chain, whereby said cradle is positively restrained against movement relative to said run in the paying out direction, said cradle comprising means to restrain said solid object against movement in the paying out direction relative to said cradle, and means for controllably rotating of at least one of said sprocket wheels for permitting said cradle, and therefore said solid object, to move in said paying out direction at a controlled speed.

3. A device for paying out from a ship a submarine cable which may have a solid object connected in it, comprising a pair of endless bands, wheels on which said endless bands run so as to provide contiguous runs of said endless bands, tracks extending alongside said contiguous runs respectively, each track being on one side of its contiguous run opposite to the other contiguous run, fixed bearings for said wheels located so that the wheels of the two endless bands are sufficiently far apart to provide a slack in at least one of the endless bands and enable a solid object to pass between them, means for moving said tracks relatively together and thereby pressing said contiguous runs together by virtue of the slack in at least one of the endless bands while said bearings remain stationary, for gripping the cable longitudinally between said contiguous runs, means for controlling the rotation of at least one of said wheels, whereby said cable is payed out in a controlled manner, means for moving said tracks, together with said runs, relatively apart, by virtue of the slack in at least one of the endless bands, while said fixed bearings remain stationary to enable a solid object to pass longitudinally between said wheels and said contiguous runs, and an additional paying out device for paying out the solid object while said solid object is being passed between said contiguous runs, said additional paying out device comprising an endless drag chain, sprocket wheels on which said endless drag chain runs, a cradle adapted to receive said solid object, means for coupling said cradle to a run of said drag chain, whereby said cradle is positively restrained against movement relative to said run in the paying out direction, said cradle comprising means to restrain said solid object against movement in the paying out direction relative to said cradle, and means for controllably rotating of at least one of said sprocket wheels through the medium of a worm and worm wheel transmission for permitting said cradle, and therefore said solid object, to move in said paying out direction at a controlled speed.

4. A device for paying out from a ship a submarine cable which may have a solid object connected in it, comprising a pair of endless bands, wheels on which said endless bands run so as to provide contiguous runs of said endless bands, tracks extending alongside said contiguous runs respectively, each track being on the side of its contiguous run opposite to the other contiguous run, fixed bearings for said wheels located so that the wheels of the two endless bands are sufficiently far apart to provide a slack in at least one of the endless bands and enable a solid object to pass between them, means for moving said tracks relatively together and thereby pressing said contiguous runs together by virtue of the slack in at least one of the endless bands while said bearings remain stacontiguous runs, means for controlling the rotation of at least one of said wheels, whereby said cable is payed out in a controlled manner, means for moving said tracks, together with said runs, relatively apart, by virtue of the slack in at least one of the endless bands, while said fixed bearings remain stationary to enable a solid object to pass longitudinally between said wheels and said contiguous runs, and an additional paying out device for paying out the solid object while said solid object is being passed between said contiguous runs, said additional paying out device comprising an endless drag chain, sprocket wheels on which said endless drag chain runs, a cradle adapted to receive said solid object, means for coupling said cradle to a run of said drag chain, whereby said cradle is positively restrained against movement relative to said run in the paying out direction, said cradle comprising means to restrain said solid object against movement in the paying out direction relative to said cradle and means for controllably rotating of at least one of said sprocket wheels for pertionary, for gripping the cable longitudinally between mitting said cradle and therefore said solid object, to move in said paying out direction at a controlled speed, the means to restrain said solid object against movement in the paying out direction relative to said cradle being releasable whereby, after said solid object has passed between the contiguous runs of said endless bands, said solid object can be payed out from said cradle by means of the cable under control of said endless bands and tracks.

5. A device for paying out from a ship a submarine cable which may have a solid object connected in it, comprising a pair of endless bands, wheels on which said endless bands run so as to provide contiguous runs of said endless bands, tracks extending alongside said contiguous runs respectively, each track being on the side of its contiguous run opposite to the other contiguous run, fixed bearings for said wheels located so that the wheels of the two endless bands are sufficiently far apart to provide a slack in at least one of the endless bands and enable a solid object to pass between them, means for moving said tracks relatively together and thereby pressing said contiguous runs together by virtue of the slack in at least one of the endless bands while said bearings remain stationary, for gripping the cable longitudinally between said contiguous runs, means for controlling the rotation of at least one of said wheels, whereby said cable is payed out in a controlled manner, means for moving said tracks, together with said runs, relatively apart, by virtue of the slack in at least one of the endless bands, while said fixed bearings remain stationary to enable a solid object to pass longitudinally between said wheels and said contiguous runs, and an additional paying out device for paying out the solid object while said solid object is being passed between said contiguous runs, said additional paying out device comprising two parallel endless drag chains, sprocket wheels on which said endless drag chains run, fixed runways over which two runs of the two drag chains pass, a cradle adapted to receive said solid object and adapted to rest on said runs of said drag chains, co-engaging parts on said cradle and said drag chains, whereby said cradle is prevented from moving relative to said runs in the paying out direction, said cradle comprising means to restrain said solid object against movement relative to said cradle in the paying out direction, and means for controllably rotating certain of said sprocket wheels for permitting said cradle and therefore said solid object to move in the paying out direction at a controlled speed, said means to restrain said solid object against movement in the paying out direction relative to said cradle being releasable whereby, after said solid object has passed between the contiguous runs of said endless bands, said solid object can be payed out from said cradle by means of the cable under control of said endless bands and tracks.

References Cited in the file of this patent

UNITED STATES PATENTS

| 1,904,885 | Seeley | Apr. 18, 1933 |
| 2,142,932 | Beard | Jan. 3, 1939 |
| 2,387,446 | Herz | Oct. 23, 1945 |
| 2,438,448 | Morton et al. | Mar. 23, 1948 |
| 2,642,280 | Fisk | June 16, 1953 |

FOREIGN PATENTS

| 355,002 | Great Britain | Aug. 20, 1931 |